(12) United States Patent
Takase (10) Patent No.: US 11,187,125 B2
(45) Date of Patent: Nov. 30, 2021

(54) ELECTRIC HEATING TYPE SUPPORT, EXHAUST GAS PURIFYING DEVICE, METHOD FOR PRODUCING ELECTRIC HEATING TYPE SUPPORT, JOINED BODY, AND METHOD FOR PRODUCING JOINED BODY

(71) Applicant: NGK INSULATORS, LTD., Nagoya (JP)

(72) Inventor: Naoya Takase, Nagoya (JP)

(73) Assignee: NGK Insulators, Ltd.

( * ) Notice: Subject to any disclaimer, the term of this patent is extended or adjusted under 35 U.S.C. 154(b) by 0 days.

(21) Appl. No.: 16/807,383

(22) Filed: Mar. 3, 2020

(65) Prior Publication Data

US 2020/0291840 A1 Sep. 17, 2020

(30) Foreign Application Priority Data

Mar. 15, 2019 (JP) .............................. JP2019-049052

(51) Int. Cl.
*F01N 3/20* (2006.01)
*F01N 3/28* (2006.01)

(52) U.S. Cl.
CPC .......... *F01N 3/2013* (2013.01); *F01N 3/2026* (2013.01); *F01N 3/2825* (2013.01); *F01N 3/2842* (2013.01); *F01N 2330/02* (2013.01); *F01N 2330/06* (2013.01); *F01N 2330/32* (2013.01); *F01N 2450/22* (2013.01)

(58) Field of Classification Search
CPC .... F01N 3/2013; F01N 3/2026; F01N 3/2825; F01N 3/2842; F01N 2330/02; F01N 2330/06; F01N 2330/32; F01N 2450/22

USPC ................................... 60/286, 300, 303, 320
See application file for complete search history.

(56) References Cited

U.S. PATENT DOCUMENTS

| | | | | |
|---|---|---|---|---|
| 5,259,190 A | * | 11/1993 | Bagley | B01D 46/0063 60/300 |
| 2011/0250097 A1 | * | 10/2011 | Ido | B03C 3/51 422/177 |
| 2015/0158016 A1 | * | 6/2015 | Mori | B01J 23/28 422/174 |
| 2018/0280872 A1 | | 10/2018 | Noro | |

FOREIGN PATENT DOCUMENTS

JP 2018-172258 A1 11/2018

* cited by examiner

*Primary Examiner* — Mark A Laurenzi
*Assistant Examiner* — Mickey H France
(74) *Attorney, Agent, or Firm* — Burr & Brown, PLLC (57) ABSTRACT

An electric heating type support includes: an electrically conductive honeycomb structure including a pillar shaped honeycomb structure portion composed of conductive ceramics, the pillar shaped honeycomb structure portion including: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, each metal terminal being joined to a surface of the electrically conductive honeycomb structure via a welded portion so as to follow a surface shape of the electrically conductive honeycomb structure.

10 Claims, 7 Drawing Sheets

ELECTRIC HEATING TYPE SUPPORT, EXHAUST GAS PURIFYING DEVICE, METHOD FOR PRODUCING ELECTRIC HEATING TYPE SUPPORT, JOINED BODY, AND METHOD FOR PRODUCING JOINED BODY

FIELD OF THE INVENTION

The present invention relates to an electric heating type support, an exhaust gas purifying device, a method for producing an electric heating type support, a joined body, and a method for producing a joined body. More particularly, the present invention relates to an electric heating type support, an exhaust gas purifying device, a method for producing the electric heating type support, a joined body, and a method for producing the joined body, which have good joining reliability between a metal terminal and a honeycomb structure.

BACKGROUND OF THE INVENTION

Conventionally, a catalyst supported on a pillar shaped honeycomb structure having a plurality of partition walls that define a plurality of cells penetrating from one end face to other end face to form flow paths is used in order to purify harmful substances such as HC, CO, and $NO_x$ contained in an exhaust gas discharged from an engine of a motor vehicle or the like. Thus, when treating the exhaust gas with the catalyst supported on the honeycomb structure, it is necessary to raise the temperature of the catalyst to its activation temperature. However, at the time of starting of the engine, the catalyst does not reach the activation temperature. Therefore, there is a problem that the exhaust gas is not sufficiently purified. In particular, a plug-in hybrid vehicle (PHEV) or a hybrid vehicle (HV) includes traveling only with a motor in the travel motion, so that it has less engine start frequency and also a decreased catalyst temperature at the time of starting of the engine, which will tend to deteriorate exhaust gas purification performance.

To solve the problem, an electric heating catalyst (EHC) has been proposed, in which a pair of terminals are connected to a pillar shaped honeycomb structure composed of conductive ceramics, and the honeycomb structure itself is heated by electric conduction, so that the temperature of the catalyst can be raised to its activation temperature before starting of the engine. The EHC is desired to reduce temperature unevenness in the honeycomb structure to have a uniform temperature distribution, in order to obtain a sufficient catalytic effect.

The terminals are generally composed of a metal, which is different from the material of the honeycomb structure composed of ceramics. Therefore, applications used in a high-temperature oxidizing atmosphere such as in an exhaust pipe of a motor vehicle are required to ensure mechanical and electrical joining reliability between the honeycomb structure and the metal terminals in the high-temperature atmosphere.

To solve such problems, Patent document 1 discloses a technique for applying thermal energy from metal terminal sides to join metal terminals to electrode layers of a honeycomb structure by means of welding. Further, it discloses that according to such a structure, it is possible to provide a conductive honeycomb structure with improved joining reliability to the metal terminals.

CITATION LIST

Patent Literature

Patent Literature 1: Japanese Patent Application Publication No. 2018-172258 A

SUMMARY OF THE INVENTION

Figure 1:
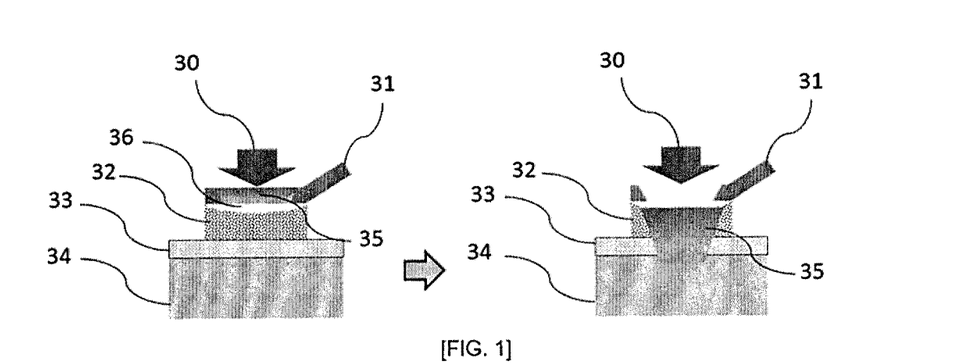
FIG. 1 is a schematic cross-sectional view near a joined portion between a honeycomb structure and a metal terminal, for showing a conventional welding method.

Conventionally, when joining a honeycomb structure to a metal terminal, as shown in FIG. 1, a honeycomb structure and a metal terminal 31 are firstly brought into contact with each other. FIG. 1 illustrates a structure in which the honeycomb structure includes: a honeycomb structure portion 34 composed of conductive ceramics; and an electrode layer 33 and a welding base layer 32 on the honeycomb structure portion 34. In this case, a gap 36 may be generated between the honeycomb structure and the metal terminal 31 due to an effect of processing accuracy or the like. When welding is carried out by a laser 30 while maintaining the gap 36 formed between the honeycomb structure and the metal terminal 31, the thermal energy applied to the metal terminal 31 is not transmitted to the honeycomb structure, and only the metal terminal 31 may be abnormally heated. When only the metal terminal 31 is abnormally heated, only the metal terminal will be melted, which will be difficult to join the metal terminal 31 to the honeycomb structure.

The present invention has been made in view of the above circumstances. An object of the present invention is to provide an electric heating type support, an exhaust gas purifying device, a method for producing an electric heating type support, a joined body, and a method for producing a joined body, which have good joining reliability between a metal terminal and a honeycomb structure.

As a result of intensive studies, the present inventors have found that the above problems can be solved by joining metal terminals via welded portions so as to follow a surface shape of a honeycomb structure. Thus, the present invention is specified as follows:

(1)

An electric heating type support, comprising:

an electrically conductive honeycomb structure comprising a pillar shaped honeycomb structure portion composed of conductive ceramics, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, each metal terminal being joined to a surface of the electrically conductive honeycomb structure via a welded portion so as to follow a surface shape of the electrically conductive honeycomb structure.

(2)

An electric heating type support, comprising:

an electrically conductive honeycomb structure comprising a pillar shaped honeycomb structure portion composed of conductive ceramics, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, each metal terminal being joined to a surface of the electrically conductive honeycomb structure via a welded portion, wherein a shear stress between the electrically conductive honeycomb structure and each metal terminal is 50 N or more.

(3)

An exhaust gas purifying device, comprising: the electric heating type support according to (1) or (2); and a can body for holding the electric heating type support.

(4)

A method for producing an electric heating type support, the electric heating type support comprising:

an electrically conductive honeycomb structure comprising a pillar shaped honeycomb structure portion composed of conductive ceramics, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and a pair of metal terminals disposed so as to face each other across a central axis of the pillar shaped honeycomb structure portion, the method comprising the steps of:

disposing each of the metal terminals on a surface of the electrically conductive honeycomb structure;

applying a first thermal energy to each of the metal terminals to melt and deform each of the metal terminals; and joining each of the metal terminals to the surface of the electrically conductive honeycomb structure by applying a second thermal energy larger than the first thermal energy, after melting and deforming the metal terminal.

(5)

A joined body, comprising:

a body composed of conductive ceramics; and metal terminals each joined to a surface of the body via a welded portion so as to follow a surface shape of the body.

(6)

A method for producing a joined body, the joined body comprising:

a body composed of conductive ceramics; and metal terminals each joined to a surface of the body via a welded portion so as to follow a surface shape of the body, the method comprising the steps of:

disposing each of the metal terminals on a surface of the body and applying a first thermal energy to each of the metal terminals to melt and deform each of the metal terminals; and joining each of the metal terminals to the surface of the body by applying a second thermal energy larger than the first thermal energy, after melting and deforming the metal terminal.

According to the present invention, it is possible to provide an electric heating type support, an exhaust gas purifying device, a method for producing an electric heating type support, a joined body, and a method for producing a joined body, which have good joining reliability between a metal terminal and a honeycomb structure.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of a person skilled in the art, without departing from the spirit of the present invention.

Embodiment 1

(1. Electric Heating Type Support)

Figure 2:
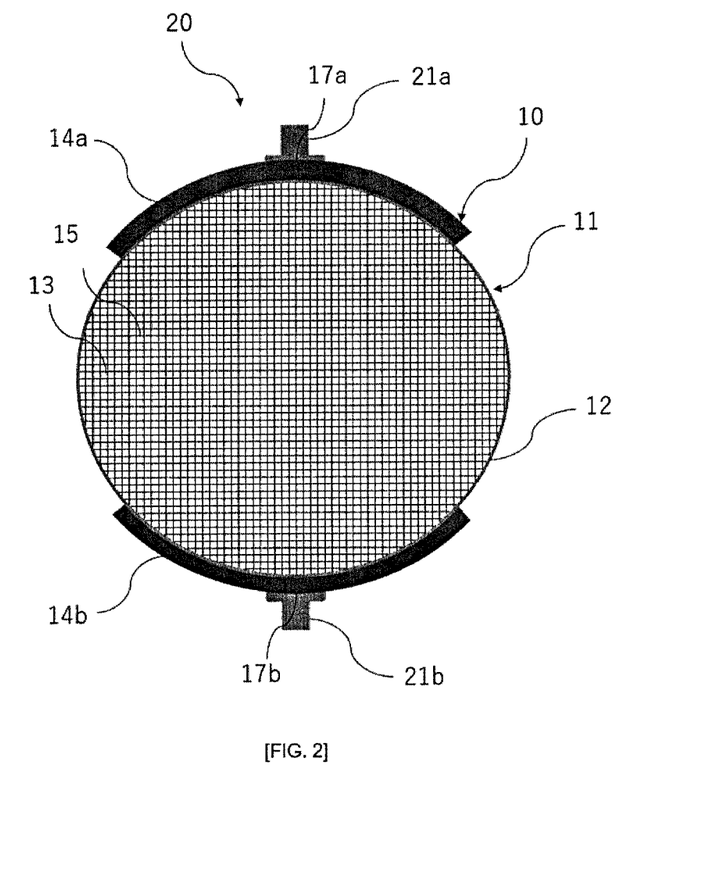
FIG. 2 is a schematic cross-sectional view of an electric heating type support according to Embodiment 1 of the present invention, which is perpendicular to a cell extending direction.

FIG. 2 is a schematic cross-sectional view of an electric heating type support 20 according to Embodiment 1 of the present invention, which is perpendicular to a cell extending direction. The electric heating type support 20 includes a honeycomb structure 10 and a pair of metal terminals 21a, 21b.

(1-1. Honeycomb structure)

Figure 3:
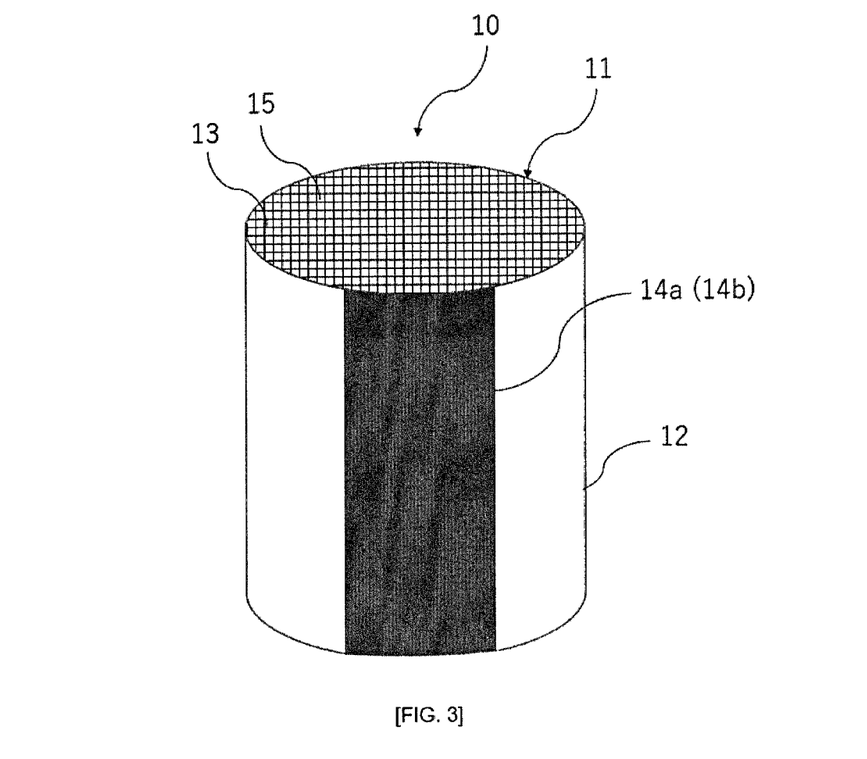
FIG. 3 is a schematic external view of a honeycomb structure according to Embodiment 1 of the present invention.

FIG. 3 is a schematic external view of the honeycomb structure 10 according to Embodiment 1 of the present invention. The honeycomb structure 10 is provided with a pillar shaped honeycomb structure portion 11 including: an outer peripheral wall 12; and porous partition walls 13 which are disposed on an inner side of the outer peripheral wall 12 and define a plurality of cells 15 penetrating from one end face to other end face to form flow paths.

An outer shape of the pillar shaped honeycomb structure portion 11 is not particularly limited as long as it is pillar shaped. For example, the honeycomb structure portion can have a shape such as a pillar shape with circular end faces (circular pillar shape) and a pillar shape with polygonal (square, pentagonal, hexagonal, heptagonal, octagonal, etc.) end faces. The pillar shaped honeycomb structure portion 11 preferably has a size of each end face of from 2000 to 20000 mm$^2$, and more preferably from 5000 to 15000 mm$^2$, for the purpose of improving heat resistance (suppressing cracks entering the outer peripheral wall in a circumferential direction).

The pillar shaped honeycomb structure portion 11 is composed of conductive ceramics. Electrical resistivity of the ceramic is not particularly limited as long as the honeycomb structure 10 can generate heat by Joule heat upon electrical conduction. The electrical resistivity is preferably from 1 to 200 Ωcm, and more preferably from 10 to 100 Ωcm. In the present invention, the electrical resistivity of the pillar shaped honeycomb structure portion 11 is a value measured at 400° C. by a four-terminal method.

Examples of the ceramics forming the pillar shaped honeycomb structure portion 11 include, but not limited to, oxide ceramics such as alumina, mullite, zirconia, and cordierite, and non-oxide ceramics such as silicon carbide, silicon nitride, and aluminum nitride. Further, a silicon carbide-metallic silicon composite material, a silicon carbide/graphite composite material, or the like can also be used. Among them, from the viewpoint of compatibility of heat resistance and conductivity, preferably, the material of the honeycomb structure portion 11 is mainly based on a silicon-silicon carbide composite material or silicon carbide, and more preferably, it is a silicon-silicon carbide composite material or silicon carbide. The phrase "the material of the honeycomb structure portion 11 is mainly based on a silicon-silicon carbide composite" means that the pillar shaped honeycomb structure portion 11 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the material of the honeycomb structure portion 10 is mainly based on silicon carbide" means that the honeycomb structure portion 11 contains 90% by mass or more of silicon carbide (total mass) based on the entire honeycomb structure.

When the material of the pillar shaped honeycomb structure portion 11 is the silicon-silicon carbide composite material, a ratio of a "mass of silicon as a bonding material" contained in the pillar shaped honeycomb structure portion 11 to the total of a "mass of silicon carbide particles as an aggregate" contained in the pillar shaped honeycomb structure portion 11 and a "mass of silicon as a bonding material" contained in the pillar shaped honeycomb structure portion 11 is preferably from 10 to 40% by mass, and more preferably from 15 to 35% by mass. When it is 10% by mass or more, the strength of the pillar shaped honeycomb structure portion 11 is sufficiently maintained. When it is 40% by mass or less, the shape is easily maintained during firing.

A shape of each cell in a cross section perpendicular to an extending direction of the cells 15 is not limited, but it is preferably a square, a hexagon, an octagon, or a combination thereof. Among these, the square and the hexagon are preferred. Such a cell shape can lead to a decreased pressure loss upon flowing of an exhaust gas through the honeycomb structure 10, resulting in improvement of purification performance of the catalyst. The rectangle is particularly preferable in terms of easily achieving both structural strength and heating uniformity.

Each of the partition walls 13 forming the cells 15 preferably has a thickness of from 0.1 to 0.3 mm, and more preferably from 0.15 to 0.25 mm. The thickness of each partition wall 13 of 0.1 mm or more can suppress a decrease in the strength of the honeycomb structure. The thickness of each partition wall 13 of 0.3 mm or less can suppress an increase in pressure loss upon flowing of an exhaust gas, when the honeycomb structure is used as a catalyst support and a catalyst is supported thereon. In the present invention, the thickness of the partition wall 13 is defined as a length of a portion passing through the partition wall 13, among line segments connecting centers of gravity of the adjacent cells 15 in a cross section perpendicular to the extending direction of the cells 15.

The honeycomb structure 10 preferably has a cell density of from 40 to 150 cells/cm$^2$, and more preferably from 70 to 100 cells/cm$^2$, in a cross section perpendicular to a flow path direction of cells 15. The cell density in such a range can increase the purification performance of the catalyst while reducing the pressure loss upon flowing of an exhaust gas. If the cell density is lower than 40 cells/cm$^2$, a catalyst supporting area may decrease. If the cell density is higher than 150 cells/cm$^2$, a pressure loss upon flowing of an exhaust gas may be increased when the honeycomb structure 10 is used as a catalyst support and a catalyst is supported thereon. The cell density is a value obtained by dividing the number of cells by an area of one end face of the pillar shaped honeycomb structure portion 11 excluding the outer peripheral wall 12.

The provision of the outer peripheral wall 12 of the honeycomb structure 10 is useful in terms of ensuring the structural strength of the honeycomb structure 10 and preventing a fluid flowing through the cells 15 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall and the partition wall 13 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a cell extending direction.

The partition walls 13 can be porous. A porosity of the partition wall 13 is preferably from 35 to 60%, and more preferably from 35 to 45%. The porosity of 35% or more can lead to more easy suppression of deformation during firing. The porosity of 60% or less can allow the strength of the honeycomb structure to be sufficiently maintained. The porosity is a value measured by a mercury porosimeter.

The partition walls 13 of the pillar shaped honeycomb structure portion 11 preferably have an average pore diameter of from 2 to 15 μm, and more preferably from 4 to 8 μm. The average pore diameter of 2 μm or more can prevent excessively high electric resistivity. The average pore diameter of 15 μm or less can prevent excessively low electric resistivity. The average pore diameter is a value measured by a mercury porosimeter.

The honeycomb structure 10 includes a pair of electrode layers 14$a$, 14$b$ composed of conductive ceramics, which are disposed on the surface of the outer peripheral wall 12 of the pillar shaped honeycomb structure portion 11, so as to face each other across a center axis of the pillar shape honeycomb structure portion 11. The pair of electrode layers 14$a$ and 14$b$ include welded portions 17$a$, 17$b$, respectively.

The electrode layers 14$a$, 14$b$ may be formed in a non-limiting region. In terms of enhancing uniform heat generation of the pillar shaped honeycomb structure portion 11, each of the electrode layers 14$a$, 14$b$ is preferably provided so as to extend in a form of belt in the circumferential direction and the cell extending direction. More particularly, It is desirable that each of the electrode layers 14a, 14b extends over a length of 80% or more, and preferably 90% or more, and more preferably the full length, between both end faces of the pillar shaped honeycomb structure portion 11, from the viewpoint that a current easily spreads in an axial direction of each of the electrode layers 14a, 14b.

Each of the electrode layers 14a, 14b preferably has a thickness of from 0.01 to 5 mm, and more preferably from 0.01 to 3 mm. Such a range can allow uniform heat generation to be enhanced. The thickness of each of the electrode layers 14a, 14b of 0.01 mm or more can lead to appropriate control of electric resistance, resulting in more uniform heat generation. The thickness of each of the electrode layers 14a, 14b of 5 mm or less can reduce a risk of breakage during canning. The thickness of each of the electrode layers 14a, 14b is defined as a thickness in a direction of a normal line to a tangential line at a measurement point on an outer surface of each of the electrode layers 14a, 14b when observing the point of each electrode layer to be subjected to thickness measurement in a cross section perpendicular to the cell extending direction.

The electric resistivity of each of the electrode layers 14a, 14b is lower than the electric resistivity of the pillar shaped honeycomb structure portion 11, whereby the electricity tends to flow preferentially to the electrode layers, and the electricity tends to spread in the cell flow path direction and the circumferential direction during electric conduction. The electric resistivity of the electrode layers 14a, 14b is preferably 1/10 or less, and more preferably 1/20 or less, and even more preferably 1/30 or less, of the electric resistivity of the pillar shaped honeycomb structure portion 11. However, if the difference in electric resistivity between both becomes too large, the current is concentrated between ends of the opposing electrode layers to bias the heat generated in the pillar shaped honeycomb structure portion. Therefore, the electric resistivity of the electrode layers 14a, 14b is preferably 1/200 or more, and more preferably 1/150 or more, and even more preferably 1/100 or more, of the electric resistivity of the pillar shaped honeycomb structure portion 11. In the present invention, the electric resistivity of the electrode layers 14a, 14b is a value measured at 400° C. by a four-terminal method.

Each of the electrode layers 14a, 14b may be composed of a metal and a conductive ceramic. Examples of the metal include a single metal of Cr, Fe, Co, Ni, Si or Ti, or an alloy containing at least one metal selected from the group consisting of those metals. Non-limiting examples of the conductive ceramic include silicon carbide (SiC), metal compounds such as metal silicides such as tantalum silicide ($TaSi_2$) and chromium silicide ($CrSi_2$), and further a composite material (cermet) comprised of a combination of one or more of the conductive ceramics and one or more of the above metals. Specific examples of the cermet include a composite material of metallic silicon and silicon carbide, a composite material of metallic silicide such as tantalum silicide and chromium silicide, metallic silicon and silicon carbide, and further a composite material containing, in addition to one or more metals listed above, one or more insulating ceramics such as alumina, mullite, zirconia, cordierite, silicon nitride, and aluminum nitride, in terms of decreased thermal expansion. As the material of the electrode layers 14a, 14b, among the various metals and conductive ceramics as described above, a combination of a metal silicide such as tantalum silicide and chromium silicide with a composite material of metallic silicon and silicon carbide is preferable, because it can be fired simultaneously with the pillar shaped honeycomb structure portion, which contributes to simplification of the producing steps.

(1-2. Metal Terminal)

The pair of metal terminals 21a, 21b are disposed so as to face each other across the central axis of the pillar shaped honeycomb structure portion 11 of the honeycomb structure 10, and are provided on the pair of electrode layers 14a, 14b, respectively, and are electrically connected. Accordingly, as a voltage is applied to the metal terminals 21a, 21b through the electrode layers 14a, 14b, then the electricity is conducted through the metal terminals 21a, 21b to allow the honeycomb structure 10 to generate heat by Joule heat. Therefore, the honeycomb structure 10 can also be suitably used as a heater. The applied voltage is preferably from 12 to 900 V, and more preferably from 64 to 600 V, although the applied voltage can be changed as needed.

The pair of metal terminals 21a, 21b are joined to a surface of the honeycomb structure 10 via welded portions 17a, 17b, respectively, so as to follow the surface shape of the honeycomb structure 10. As used herein, the phrase "pair of metal terminals 21a, 21b are joined so as to follow the surface shape of the honeycomb structure 10" means that there is no gap on a joined surface between the surface of the honeycomb structure 10 and each of the metal terminals 21a, 21b. Such a configuration can allow the thermal energy applied to the metal terminals 21a, 21b to be satisfactorily transmitted to the honeycomb structure 10 when the metal terminals 21a, 21b are joined to the surface of the honeycomb structure 10 by means of welding. Therefore, it is possible to prevent only the metal terminals 21a, 21b from being abnormally heated and melted. Accordingly, the electric heating type support 20 having good joining reliability between the metal terminals 21a, 21b and the honeycomb structure 10 can be obtained.

A shear stress between the honeycomb structure 10 and the metal terminals 21a, 21b is 50 N or more. Such a configuration can lead to improvement of joining reliability between the metal terminals 21a, 21b and the honeycomb structure 10. The shear stress between the honeycomb structure 10 and the metal terminals 21a, 21b is preferably from 50 to 150 N, and more preferably from 70 to 130 N. In addition, the shear stress between the honeycomb structure 10 and the metal terminals 21a, 21b can be measured by using a universal material tester 3300 (available from Instron) or the like and referring to the method of JIS Z 2241.

The material of the metal terminals 21a, 21b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal terminals 21a, 21b are not particularly limited, and they can be appropriately designed according to the size of the electric heating type support 20, the electrical conduction performance, and the like.

The metal terminals 21a, 21b are joined to the electrode layers 14a, 14b, respectively, via one or more welded portions 17a, 17b. A decrease in a welded area of each of the welded portions 17a, 17 can suppress cracking and peeling due to a difference in thermal expansion. More particularly, the welded area of each of the welded portions 17a, 17b per a portion is preferably 50 mm² or less, and more preferably 45 mm² or less, and still more preferably 40 mm² or less, and even more preferably 30 mm² or less. However, if the welded area of each of the welded portions 17a, 17b per a portion is excessively small, the joining strength cannot be ensured. Therefore, it is preferably 2 mm$^2$ or more, and more preferably 3 mm$^2$ or more, and even more preferably 4 mm$^2$ or more.

Two or more welded portions 17a, 17b are preferably formed to increase the total welded area, thereby increasing the joining strength, although it depends on the size of the metal terminals 21a, 21b. More particularly, the total welded area of one or more welded portions per each metal terminal is preferably 2 mm$^2$ or more, and more preferably 3 mm$^2$ or more, and even more preferably 4 mm$^2$ or more. On the other hand, if the total welded area is excessively large, the thermal shock resistance tends to deteriorate. Therefore, in terms of ensuring the thermal shock resistance, the total welded area of one or two or more welded portions 17a, 17b per each metal terminal is preferably 120 mm$^2$ or less, and more preferably 110 mm$^2$ or less, and even more preferably 100 mm$^2$ or less.

When two or more welded portions 17a, 17b are provided for each metal terminal, it is preferable that a distance between adjacent welded portions is maintained at a certain level or more depending on the welded areas of the welded portions, in terms of increasing the joining strength while ensuring the thermal shock resistance. There is no particular problem even if the distance between the welded portions is larger, and the distance may be appropriately set in consideration of the size of each metal terminal.

It is preferable to have a plurality of positions where welded depths are deeper than those of other positions in the welded portions 17a, 7b. The joining strength between the metal terminals 21a, 21b and the honeycomb structure 10 is larger when the welded depths in the welded portions 17a, 17b are thus deeper than the other portions, rather than when the welded depths are uniform. As such a configuration, for example, the portions where the welded depths are deeper than those of the other portions may be formed in a shape that deeply bites into the welded portions 17a, 17b so as to be wedge-shaped. The welded depth is not particularly limited, and it may be appropriately set in consideration of the size of each of the metal terminals 21a, 21b and the honeycomb structure 10.

By supporting the catalyst on the electric heating type support 20, the electric heating type support 20 can be used as a catalyst. For example, a fluid such as an exhaust gas from a motor vehicle can flow through the flow paths of the plurality of cells 15. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides (NO$_x$). Illustrative examples of a catalyst that does not use the noble metal include a NOx selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(2. Method for producing Electric Heating Type Support)

A method for producing the electric heating type support 20 according to the present invention will now be illustratively described. In an embodiment, the method for producing the electric heating type support 20 according to the present invention includes: a step A1 of obtaining an unfired honeycomb structure portion with an electrode layer forming paste; a step A2 of firing the unfired honeycomb structure portion with the electrode layer forming paste to form a honeycomb structure; and a step A3 of welding metal terminals to the honeycomb structure.

The step A1 is to prepare a honeycomb formed body that is a precursor of the honeycomb structure portion, and apply an electrode layer forming paste to a side surface of the honeycomb formed body to obtain an unfired honeycomb structure portion with the electrode layer forming paste. The preparation of the honeycomb formed body can be carried out in accordance with a method for preparing a honeycomb formed body in a known method for producing a honeycomb structure. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 µm, and more preferably from 3 to 40 µm. The average particle diameter of the metallic silicon (the metallic silicon powder) is preferably from 2 to 35 µm. The average particle diameter of each of the silicon carbide particles and the metallic silicon (metallic silicon particles) refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure portion is the silicon-silicon carbide composite material. In the case where the material of the honeycomb structure portion is silicon carbide, no metallic silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 µm. If the average particle diameter is less than 10 µm, pores may not be sufficiently formed. If the average particle diameter is more than 30 μm, a die may be clogged during forming. The average particle diameter of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure. In extrusion molding, a die having a desired overall shape, cell shape, partition wall thickness, cell density and the like can be used. Preferably, the resulting honeycomb structure is then dried. When the length in the central axis direction of the honeycomb structure is not the desired length, both the end faces of the honeycomb structure can be cut to the desired length. The honeycomb structure after drying is referred to as a honeycomb dried body.

The electrode layer forming paste for forming electrode layers is then prepared. The electrode layer forming paste can be formed by appropriately adding and kneading various additives to raw material powder (metal powder, ceramic powder, and the like) formulated according to required characteristics of the electrode layers. When one forms each electrode layer as a laminated structure, the joining strength between each metal terminal and each electrode layer tends to be improved by increasing an average particle diameter of the metal powder in the past for the second electrode layer, as compared with an average particle diameter of the metal powder in the paste for the first electrode layer. The average particle diameter of the metal powder refers to an arithmetic average diameter on volume basis when frequency distribution of the particle diameter is measured by the laser diffraction method.

The resulting electrode layer forming paste is applied to the side surface of the honeycomb formed body (typically, the honeycomb dried body) to obtain an unfired honeycomb structure portion with an electrode layer forming paste. The method for preparing the electrode layer forming paste and the method for applying the electrode layer forming paste to the honeycomb formed body can be performed according to a known method for producing a honeycomb structure. However, in order to achieve lower electrical resistivity, it is possible to increase a metal content ratio or to decrease the particle diameter of the metal particles as compared with the honeycomb structure portion.

As a variation of the method for producing the honeycomb structure, in the step A1, the honeycomb formed body may be temporarily fired before applying the electrode layer forming paste. That is, in this variation, the honeycomb formed body is fired to produce a honeycomb fired body, and the electrode fired paste is applied to the honeycomb fired body.

In the step A2, the unfired honeycomb structure portion with the electrode layer forming paste is fired to obtain a honeycomb structure. Prior to firing, the unfired honeycomb structure with the electrode layer forming paste may be dried. Also, prior to firing, degreasing may be carried out to remove the binder and the like. As the firing conditions, the unfired honeycomb structure is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

In the step A3, a pair of metal terminals is welded to the surfaces of the electrode layers of the honeycomb structure. A preferable welding method may be laser welding from the metal terminal side, in terms of control of the welded area and production efficiency. In this case, the laser welding is carried out twice in total by separating it into a previous stage and a subsequent stage. More particularly, a first thermal energy is firstly applied to the metal terminals by a laser to melt and deform the metal terminals so as to follow the surface shape of the honeycomb structure. Examples of the laser welding include laser screw welding and the like. According to the laser screw welding, the laser can be circularly scanned to control a flow of a melt of the metal terminal. Therefore, even if there is a gap at an interface between the surface of each electrode layer and each metal terminal due to processing accuracy or the like, the gap can be completely filled by melting and deforming the metal terminals. Although an amount of melting and deforming of the metal terminals by the first thermal energy of the laser is not particularly limited, 50% or less of the thickness of each metal terminal can be melted. The amount of melting and deforming of the metal terminals can be appropriately designed as illustrated below. Here, it is assumed that there is a gap of 0.1 mm at the interface between the surface of each electrode layer and each metal terminal, and the thickness of each metal terminal is 0.4 mm. In this case, the first laser energy is applied to carrying out the previous stage laser welding such that the amount of melting and deforming of the metal terminals is about 25% of the thickness. Then, a gap (0.4 mm×25%=0.1 mm) can be filled.

Subsequently, after the metal terminals are melted and deformed, a second thermal energy larger than the first thermal energy is applied by a laser to join the metal terminals to the surface of the honeycomb structure. In this case, since the gap at the interface between the surface of each electrode layer and each metal terminal has already been completely filled by the previous stage laser welding, the metal terminals can be directly joined without any gap, i.e., so as to follow the surface shape of the honeycomb structure. As a result, it is possible to provide an electric heating type support having good joining reliability between each metal terminal and the honeycomb structure.

Further, according to such a welding method, the metal terminals are melted and deformed by the previous stage laser welding to fill the gap at the interface between the surface of each electrode layer and each metal terminal. Therefore, regardless of the shape of the surface of each electrode layer (the surface of the honeycomb structure) or the shape of the gap at the interface between the surface of each electrode layer and each metal terminal, the gap can be easily filled. Furthermore, by simply designing a laser output during the laser welding, the metal terminals can be easily melted and deformed to fill the gap at the interface between the surface of each electrode layer and each metal terminal, regardless of the thickness of each metal terminal.

The laser output in the above laser welding at the previous stage can be, for example, from 20 to 100 W/mm$^2$, although it depends on the materials and thicknesses of the metal terminals. Further, the laser output of the laser welding at the subsequent stage can be, for example, from 150 to 400 W/mm$^2$, although it depends on the materials and thicknesses of the metal terminals.

Embodiment 2

Figure 4:
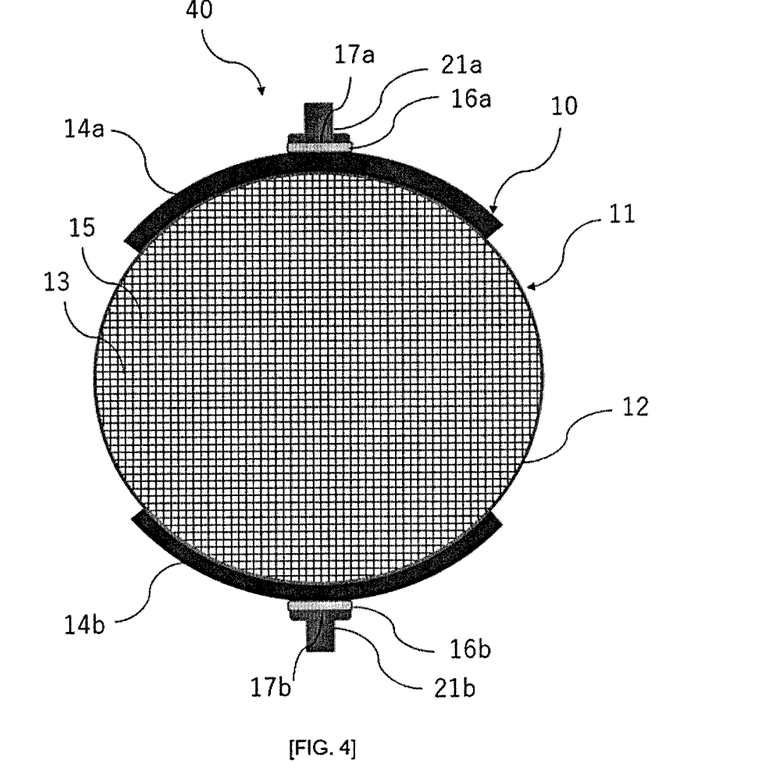
FIG. 4 is a schematic cross-sectional view of an electric heating type support according to Embodiment 2 of the present invention, which is perpendicular to a cell extending direction.

FIG. 4 is a schematic cross-sectional view of an electric heating type support 40 according to Embodiment 2 of the present invention, which is perpendicular to the cell extending direction. As shown in FIG. 4, the electric heating type support 40 according to Embodiment 2 of the present invention is different from the electric heating type support 20 according to Embodiment 1 in that the electric heating type support 40 further includes a pair of welding base layers 16a, 16b composed of conductive ceramics, between the electrode layers 14a, 14b and the metal terminals 21a, 21b, respectively. One welding base layer 16a of the pair of welding base layers 16a, 16b is provided so as to face the other welding base layer 16b across the central axis of the pillar shaped honeycomb structure portion 11. The pair of welding base layers 16a, 16b includes the welded portions 17a, 17b, respectively.

The welding base layers 16a, 16b serve as bases for laser welding upon joining with the metal terminals 21a, 21b. Preferably, they have a function as stress relaxation layers. That is, when a difference in a linear expansion coefficient between the electrode layers 14a, 14b and the metal terminals 21a, 21b is larger, clacking may be generated in the electrode layers 14a, 14b due to thermal stress. Therefore, it is preferable that the welding base layers 16a, 16b have a function of alleviating the thermal stress caused by the difference in the linear expansion coefficient between the electrode layers 14a, 14b and the metal terminals 21a, 21b. This can prevent cracking from being generated in the electrode layers 14a, 14b, at the time of welding the metal terminals 21a, 21b to the electrode layers 14a, 14b, or due to repeated fatigue of the thermal cycle.

The welding base layers 16a, 16b are composed of conductive ceramic. Examples of the conductive ceramic include, but not limited to, silicon carbide (SiC), metal compounds such as metal silicides such as tantalum silicide ($TaSi_2$) and chromium silicide ($CrSi_2$), and composite materials (cermet) containing a combination of one or more of the conductive ceramics and one or more of the above metals. Specific examples of the cermet include a composite material of metallic silicon and silicon carbide, a composite material of metallic silicide such as tantalum silicide and chromium silicide, metallic silicon and silicon carbide, and a composite material containing, in addition to the above one or more metals, one or more insulating ceramics such as alumina, mullite, zirconia, cordierite, silicon nitride, and aluminum nitride, in terms of reduction of thermal expansion. The material of the welding base layers 16a, a16b may be preferably a combination of a metal silicide such as tantalum silicide and chromium silicide with a composite material of metallic silicon and silicon carbide, among the various conductive ceramics as described above, for the reason that it can allow simultaneous firing with the honeycomb structure portion so that it can contribute to simplification of the producing steps.

In Embodiment 1, the unfired honeycomb structure portion with the electrode layer forming paste was prepared and fired to produce the honeycomb structure. At this time, in Embodiment 2, a welding base layer forming paste is also formed at the same time, and an unfired honeycomb structure portion with a welding base layer forming paste and an electrode layer forming paste can be produced and fired to form a honeycomb structure.

In Embodiment 2, a pair of metal terminals is welded to the surfaces of the welding base layers of the honeycomb structure. The welding method can be the same as that of Embodiment 1, and laser welding is carried out twice in total by separating it into a previous stage and a subsequent stage. More particularly, a first thermal energy is firstly applied to the metal terminals by laser screw welding or the like to melt and deform the metal terminals so as to follow the surface shape of each welding base layer. Subsequently, after melting and deforming the metal terminals, a second thermal energy larger than the first thermal energy is applied by a laser to join the metal terminals to the surfaces of the welding base layers. In this case, since a gap at an interface between the surface of each welding base layer and each metal terminal has already been completely filled by the previous stage laser welding, the metal terminals can be directly joined without any gap, i.e., so as to follow the surface shape of the honeycomb structure. As a result, it is possible to provide an electric heating type support having good joining reliability between the metal terminals and the honeycomb structure.

Embodiment 3

Figure 5:
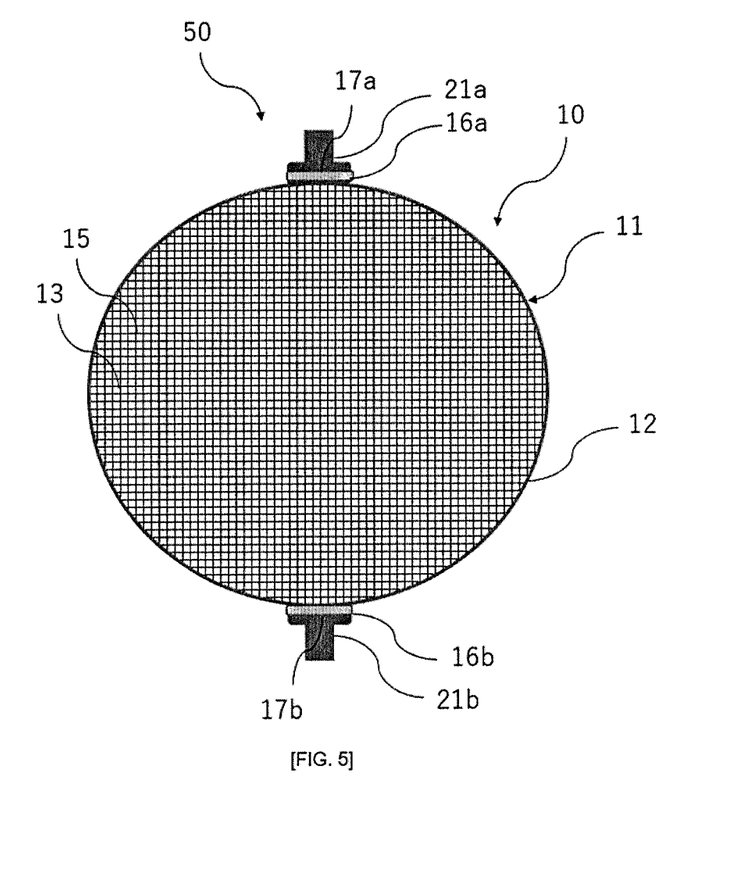
FIG. 5 is a schematic cross-sectional view of an electric heating type support according to Embodiment 3 of the present invention, which is perpendicular to a cell extending direction.

FIG. 5 is a schematic cross-sectional view of an electric heating type support 50 according to Embodiment 3 of the present invention, which is perpendicular to the cell extending direction. As shown in FIG. 5, the electric heating type support 50 according to Embodiment 3 of the present invention is different from the electric heating type support 40 according to Embodiment 2 in that the former does not include the electrode layers 14a, 14b. A pair of welding base layers 16a, 16b have welded portions 17a, 17b, respectively.

The electric heating type support 50 according to Embodiment 3 does not include any electrode layer, and the welding base layers 16a, 16b provided on the pillar shaped honeycomb structure portion 11 are joined to the metal terminals 21a, 21b, respectively, without any gap. That is, the metal terminals 21a, 21b are joined so as to follow the surface shape of the honeycomb structure 10 of the electric heating type support 50.

In Embodiment 1, the unfired honeycomb structure with the electrode layer forming paste was prepared and fired to produce a honeycomb structure. At this time, in Embodiment 3, the electrode layer forming paste is not formed, and an unfired honeycomb structure portion with the welding base layer forming paste is prepared and fired to produce a honeycomb structure.

In Embodiment 3, a pair of metal terminals is welded to the surfaces of the welding base layers of the honeycomb structure. The welding method can be the same as that of Embodiment 1, and laser welding is carried out twice in total by separating it into a previous stage and a subsequent stage. More particularly, a first thermal energy is firstly applied to the metal terminals by laser screw welding or the like to melt and deform the metal terminals so as to follow the surface shape of each welding base layer. Subsequently, after melting and deforming the metal terminals, a second thermal energy larger than the first thermal energy is applied by a laser to join the metal terminals to the surfaces of the welding base layers. In this case, since a gap at an interface between the surface of each welding base layer and each metal terminal has already been completely filled by the previous stage laser welding, the metal terminals can be directly joined without any gap, i.e., so as to follow the surface shape of the honeycomb structure. As a result, it is possible to provide an electric heating type support having good joining reliability between the metal terminals and the honeycomb structure.

Embodiment 4

Figure 6:
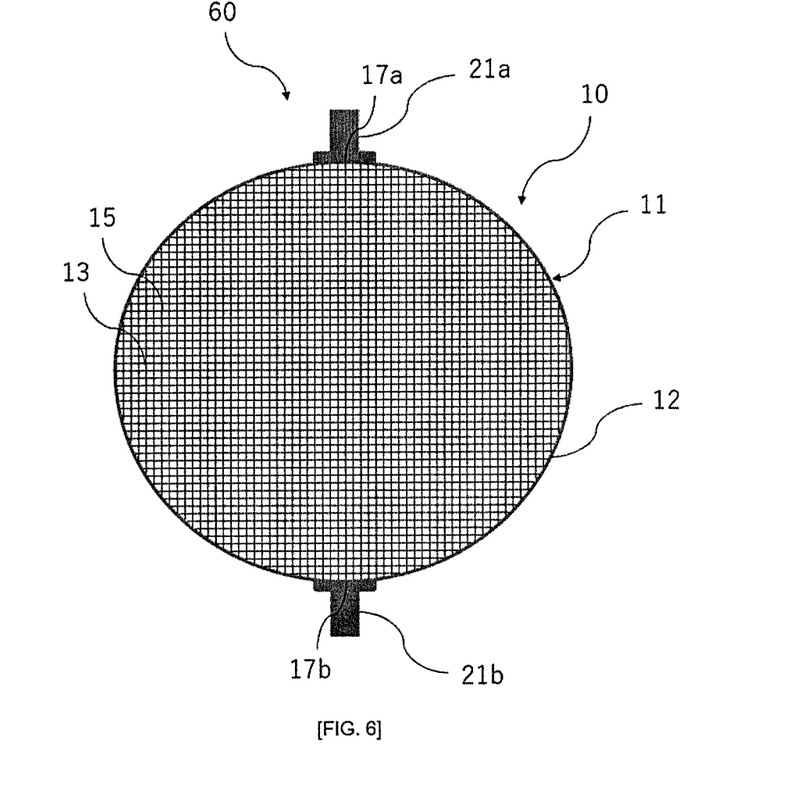
FIG. 6 is a schematic cross-sectional view of an electric heating type support according to Embodiment 4 of the present invention, which is perpendicular to a cell extending direction.

FIG. 6 is a schematic cross-sectional view of an electric heating type support 60 according to Embodiment 4 of the present invention, which is perpendicular to the cell extending direction. As shown in FIG. 6, the electric heating type support 60 according to Embodiment 4 of the present invention is different from the electric heating type support 50 according to Embodiment 3 in that the former does not include the welding base layers 16a, 16b. The pillar shaped honeycomb structure portion 11 includes welded portions 17a, 17b.

The electric heating type support 60 according to Embodiment 4 does not include any electrode layer and any welding base layer, and the pillar shaped honeycomb structure portion 11 is joined to the metal terminals 21a, 21b without any gap. That is, the metal terminals 21a, 21b are joined so as to follow the surface shape of the honeycomb structure 10 of the electric heating type support 60.

In Embodiment 1, the unfired honeycomb structure portion with the electrode layer forming paste was prepared and fired to produce the honeycomb structure. At this time, in Embodiment 4, the electrode layer forming paste is not formed, and only an unfired honeycomb structure portion is prepared and fired to produce a honeycomb structure.

In Embodiment 4, a pair of metal terminals is welded to the surface of the honeycomb structure portion of the honeycomb structure. The welding method can be the same as that of Embodiment 1, and laser welding is carried out twice in total by separating it into a previous stage and a subsequent stage. More particularly, a first thermal energy is firstly applied to the metal terminals by laser screw welding or the like to melt and deform the metal terminals so as to follow the surface shape of the honeycomb structure. Subsequently, after melting and deforming the metal terminals, a second thermal energy larger than the first thermal energy is applied by a laser to join the metal terminals to the surface of the honeycomb structure. In this case, since a gap at an interface between the surface of honeycomb structure portion and each metal terminal has already been completely filled by the previous stage laser welding, the metal terminals can be directly joined without any gap, i.e., so as to follow the surface shape of the honeycomb structure. As a result, it is possible to provide an electric heating type support having good joining reliability between the metal terminals and the honeycomb structure.

(3. Exhaust Gas Purifying Device)

Each of the electric heating type supports according to the above embodiments of the present invention can be used for an exhaust gas purifying device. The exhaust gas purifying device includes the electric heating type support and a can body for holding the electric heating type support. In the exhaust gas purifying device, the electric heating type support can be installed in an exhaust gas flow path for allowing an exhaust gas from an engine to flow. As the can body, a metal tubular member or the like for accommodating the electric heating type support can be used.

Embodiment 5

In embodiment 5, the present invention relates to a joined body including: a body composed of conductive ceramics; and metal terminals joined to a surface of the body via welded portions so as to follow a surface shape of the body. The body composed of the conductive ceramics may have any shape and size. As the conductive ceramics and the metal terminals, the same materials as those described above can be used.

In the joined body according to Embodiment 5, the metal terminals are joined to the surface of the body via welded portions so as to follow the surface shape of the body composed of the conductive ceramic, thereby resulting in good joining reliability between the body composed of the conductive ceramic and the metal terminals.

Next, a method for producing the joined body according to Embodiment 5 of the present invention will be described. First, metal terminals are placed on the surface of the body composed of conductive ceramics, and a first thermal energy is applied to the metal terminals by laser welding (laser welding at a previous stage) to melt and deform the metal terminals so as to follow the surface shape of the body. At this time, a gap at an interface between the body and each metal terminal is completely filled with the melt of the metal terminals. The laser welding at the previous stage can be carried out by laser screw welding or the like in the same manner as described above.

Subsequently, after the metal terminals are melted and deformed, a second thermal energy larger than the first thermal energy is applied by laser welding (laser welding at the subsequent stage) to join the metal terminals to the surface of the body. At this time, since the gap at the interface between the surface of the body and each metal terminal has already been completely filled by the previous laser welding, the metal terminals can be directly joined without any gap, i.e., so as to follow the surface shape of the body. As a result, the joining reliability between the metal terminals and the body is improved.

EXAMPLES

Hereinafter, Examples is illustrated for better understanding of the present invention and its advantages, but the present invention is not limited to these Examples.

Examples 1-4, Comparative Example 1

(1. Production of Circular Pillar Shaped Green Body)

Silicon carbide (SiC) powder and metallic silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide (SiC) powder and the metallic silicon (Si) powder was 100 parts by mass. The content of the pore former was 3 parts by mass when the total of the silicon carbide (SiC) powder and the metallic silicon (Si) powder was 100 parts by mass. The content of water was 42 parts by mass when the total of the silicon carbide (SiC) powder and the metallic silicon (Si) powder was 100 parts by mass. The average particle diameter of the silicon carbide powder was 20 µm, and the average particle diameter of the metallic silicon powder was 6 µm. The average particle diameter of the pore former was 20 µm. The average particle diameter of each of the silicon carbide powder, the metallic silicon powder and the pore former refers to an arithmetic mean diameter on volume basis, when measuring frequency distribution of the particle size by the laser diffraction method.

(2. Production of Honeycomb Dried Body)

The resulting pillar shaped green body was formed using an extruder having a grid pattern-like die structure to obtain a circular pillar shaped honeycomb formed body in which each cell had a square shape in a cross section perpendicular to the flow path direction of the cells. The honeycomb formed body was subjected to high-frequency dielectric heating and drying and then dried at 120° C. for 2 hours using a hot air drier, and a predetermined amount of both end faces were cut to prepare a honeycomb dried body.

(3. Preparation of Electrode Layer Forming Paste)

Tantalum silicide ($TaSi_2$) powder, metallic silicon (Si) powder, silicon carbide (SiC) powder, methyl cellulose, glycerin, and water were mixed by a planetary centrifugal mixer to prepare a first electrode layer forming paste. The $TaSi_2$ powder, the Si powder, and the SiC powder were blended in a volume ratio of $TaSi_2$ powder:Si powder:SiC powder=50:30:20. When the total of $TaSi_2$ powder, Si powder and SiC powder was 100 parts by mass, methyl cellulose was 0.5 parts by mass, glycerin was 10 parts by mass, and water was 38 parts by mass. The average particle diameter of the tantalum silicide powder was 7 μm. The average particle diameter of the metallic silicon powder was 6 μm. The average particle diameter of the silicon carbide powder was 35 μm. Each of these average particle diameters refers to an arithmetic average diameter on volume basis when frequency distribution of the particle diameter is measured by the laser diffraction method.

(4. Preparation of Welding Base Layer Forming Paste)

Chromium silicide ($CrSi_2$) powder, metallic silicon (Si) powder, methyl cellulose, glycerin, and water were mixed by a planetary centrifugal mixer to prepare a welding base layer forming paste. Here, the $CrSi_2$ powder and the Si powder were blended in a volume ratio of $CrSi_2$ powder:Si powder=90:10. When the total of the $CrSi_2$ powder and the Si powder was 100 parts by mass, methyl cellulose was 0.5 parts by mass, glycerin was 10 parts by mass, and water was 38 parts by mass. The average particle diameter of the chromium silicide powder was 7 μm. The average particle diameter of the metallic silicon powder was 6 μm.

(5. Application of Paste)

The electrode layer forming paste as described above was applied onto an outer surface of the outer peripheral wall of the above honeycomb dried body at two positions so as to face each other across the central axis. Each applied portion was formed in a belt shape over the full length between both end faces of the honeycomb dried body. The welding base layer forming paste was applied only to regions required for welding the metal terminals so as to partially cover the applied portions of the electrode layer forming paste. The honeycomb dried body after application of the electrode layer forming paste and the welding base layer forming paste was dried at 120° C. to obtain an unfired honeycomb structure portion with an electrode layer forming paste and a welding base layer forming paste.

(6. Firing)

The unfired honeycomb structure portion with the electrode layer forming paste and the welding base layer forming paste was then degreased in an air atmosphere at 550° C. for 3 hours. The degreased unfired honeycomb structure portion with the electrode layer forming paste and the welding base layer forming paste was then fired and subjected to an oxidization treatment to produce a honeycomb structure. The firing was carried out in an argon atmosphere at 1450° C. for 2 hours. The oxidation treatment was carried out in the atmosphere at 1300° C. for one hour.

The honeycomb structure had circular end faces each having a diameter of 100 mm, and a height (a length in the flow path direction of the cells) of 100 mm. The cell density was 93 cells/$cm^2$, the thickness of the partition wall was 101.6 μm, the porosity of the partition walls was 45%, and the average pore diameter of the partition walls was 8.6 μm. The thickness of each electrode layer was 0.3 mm, and the thickness of each welding base layer was 0.2 mm. The electrical resistivity at 400° C. was measured by a four-terminal method using samples having the same materials as those of the honeycomb structure, the electrode layer, and the welding base layer, indicating that it was 5 Ωcm, 0.01 Ωcm, and 0.001 Ωcm, respectively.

(7. Welding of Metal Terminals)

Examples 1 to 4 and Comparative Example 1 as described below were then subjected to the following processing.

Examples 1 to 4

SUS430 plate-shaped metal terminals (each dimension: 30 mm×50 mm×0.4 mmt) were welded by laser screw welding (laser welding at the previous stage) onto the welding base layers of the honeycomb structure obtained under the above production conditions. At this time, the laser output was 50 W/$mm^2$, the laser spot diameter was 4.0 mm, and the laser was circularly scanned to melt and deform a predetermined thickness of each metal terminal. Subsequently, using a fiber laser welding machine, subsequent stage laser (second laser) welding was carried out at the positions where the previous stage laser (first laser) welding was carried out at a laser output of 200 W/$mm^2$ (Examples 1 to 3) or 400 W/$mm^2$ (Example 4) and with a laser spot diameter of 1.0 mm. Thus, the SUS plate-shaped metal terminals were joined onto the welding base layers of the honeycomb structure.

Figure 7:
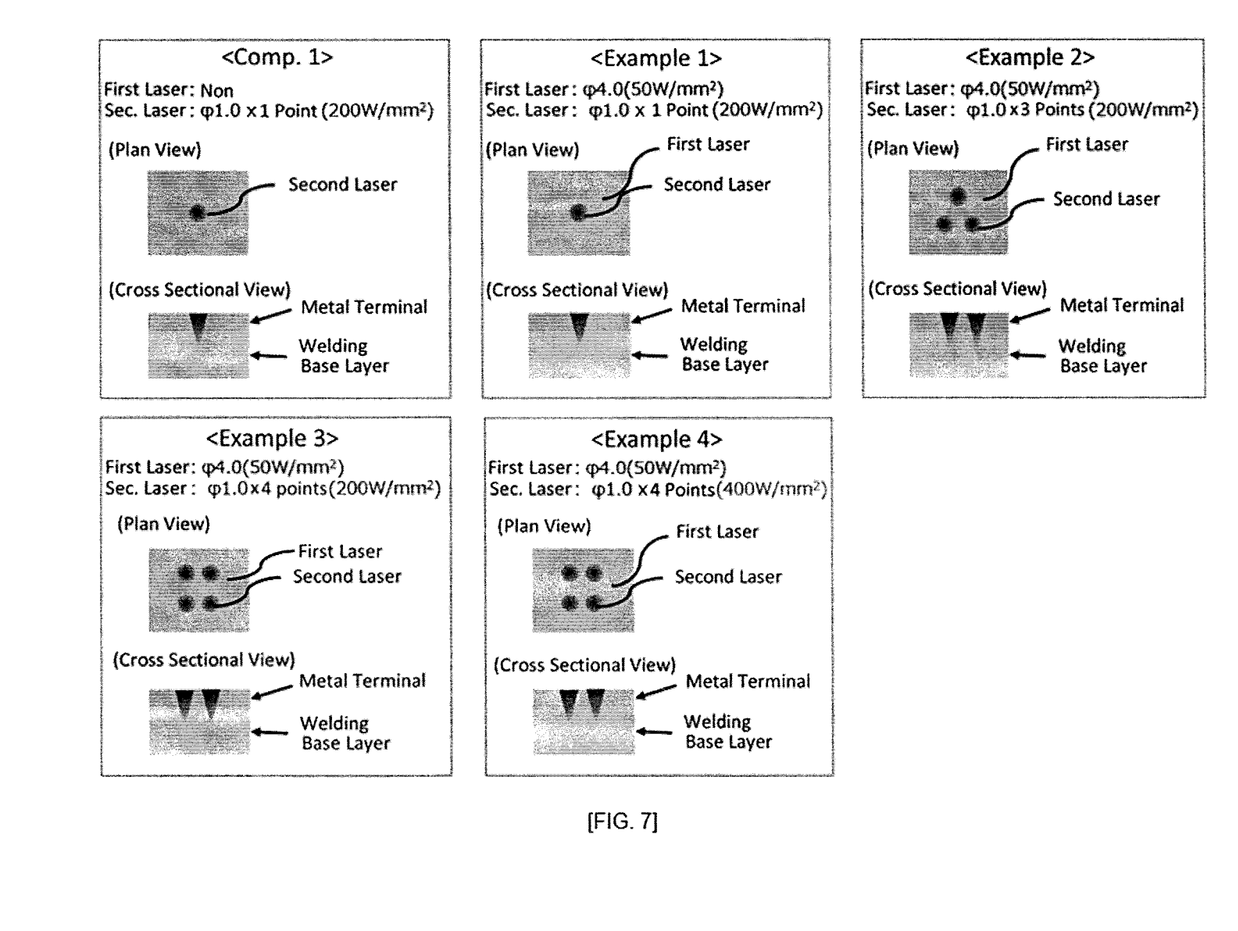
FIG. 7 is a schematic view showing each mode of laser welding carried out for Examples 1 to 4 and Comparative Example 1.

As shown in FIG. 7, in Example 1, the laser welding was carried out by irradiating only one point with the second laser at the center of the portion welded by the first laser. In Example 2, the laser welding was carried out by irradiating a total of three points each being at a position forming each top of an equilateral triangle with the second laser at the portion welded by the first laser. In Examples 3 and 4, the laser welding was carried out by irradiating a total of four points each being at a position forming each top of a regular square with the second laser at the portion welded by the first laser.

Comparative Example 1

For Comparative Example 1, SUS430 plate-shaped metal terminals (each dimension: 30 mm×50 mm×0.4 mmt) were welded by a laser with a fiber laser welding machine onto the welding base layers of the honeycomb structure obtained under the above production conditions. The laser welding was carried out at a laser output of 200 W/$mm^2$ and with a laser spot diameter of 1.0 mm, as shown in FIG. 7. That is, when compared with Examples 1 to 4, in Comparative Example 1, the previous stage laser (the first laser) welding was not carried out, and only the subsequent laser (the second laser) welding was carried out. Thus, the SUS plate-shaped metal terminals were joined onto the welding base layers of the honeycomb structure.

(8. SEM Observation)

For each of samples of Examples 1 to 4 and Comparative Example 1 where the metal terminals were joined, a cross section near the joined interface between each metal terminal and each welding base layer was polished by an ion milling apparatus (IM4000 from Hitachi High-Technologies Corporation). The polished cross section was then observed with a scanning electron microscope (available from JEOL, SEM, JSM-6610LV) at an acceleration voltage of from 10 to 20 kV. As a result, the melt of each metal terminal entered the joined interface between each metal terminal and each welding base layer, and no gap was observed. That is, the metal terminals were joined to the surface of the honeycomb structure via the welded portions so as to follow the surface shape of the honeycomb structure.

(9. Shear Stress Test)

The shear stress of each of the samples of Examples 1 to 4 and Comparative Example 1 where the metal terminals were joined was measured using a universal material tester 3300 (from Instron) with reference to the method according to JIS Z 2241. Table 1 shows measured values of the shear stress, broken positions and evaluation results obtained by the test. The evaluation criteria were such that a case where breakage was generated in the electrode layer was determined to be good joining, and the breakage was generated in the welded portions was determined to be poor joining.

TABLE 1

|  | Shear Stress [N] | Second Laser Output [W/mm$^2$] | Broken Position | Evaluation |
| --- | --- | --- | --- | --- |
| Comp. 1 | 11-17 | 200 | Welded Portion | Poor Joining |
| Example 1 | 61-81 | 200 | Electrode Layer | Good Joining |
| Example 2 | 80-91 | 200 | Electrode Layer | Good Joining |
| Example 3 | 95-103 | 200 | Electrode Layer | Good Joining |
| Example 4 | 100-113 | 400 | Electrode Layer | Good Joining |

(10. Discussion)

As shown in Table 1, in Example 1, the metal terminals were deformed by the first laser and the gap between each metal terminal and each welding base layer was eliminated, so that the melting area during welding would be increased and the shear stress would be increased.

In Examples 2 and 3, by irradiating a plurality of positions with the second laser, the joining area during welding would be increased, and the joining strength would be further increased.

In Example 4, by increasing the energy if the welding is in the same shape, the welding depth would be increased and the joining strength would be increased.

In Comparative Example 1, because of no irradiation with the first laser, there was a gap between each metal terminal and each welding base layer during irradiation with the second laser, so that the melting area during welding would be less and the shear stress would be lower than Examples 1-4.

DESCRIPTION OF REFERENCE NUMERALS 10 honeycomb structure
11 pillar shape honeycomb structure
12 outer peripheral wall
13 partition wall
14a, 14b, 33 electrode layer
15 cell
16a, 16b, 32 welding base layer
17a, 17b welded portion
20, 40, 50, 60 electric heating type support
21a, 21b, 31 metal terminal
30 laser
34 honeycomb structure portion
35 molten metal terminal
36 gap

The invention claimed is:

1. An electric heating type support, comprising:
an electrically conductive honeycomb structure comprising a pillar shaped honeycomb structure portion composed of conductive ceramics,
the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path;
a pair of electrode layers composed of conductive ceramics, the electrode layers being disposed on a surface of the outer peripheral wall of the pillar shaped honeycomb structure portion so as to face each other across the central axis of the pillar shaped honeycomb structure portion; and
a pair of metal terminals disposed so as to face each other across a central axis of the pillar shaped honeycomb structure portion, each metal terminal being joined to a surface of the electrically conductive honeycomb structure via a welded portion so as to follow a surface shape of the electrically conductive honeycomb structure;
wherein the pair of electrode layers comprise the welded portion.

2. An electric heating type support, comprising:
an electrically conductive honeycomb structure comprising a pillar shaped honeycomb structure portion composed of conductive ceramics,
the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and
a pair of metal terminals disposed so as to face each other across a central axis of the pillar shaped honeycomb structure portion, each metal terminal being joined to a surface of the electrically conductive honeycomb structure via a welded portion,
wherein a shear stress between the electrically conductive honeycomb structure and each metal terminal is 50 N or more.

3. The electric heating type support according to claim 1, wherein the electrically conductive honeycomb structure comprises a pair of welding base layers composed of conductive ceramics, each welding base layer being disposed on a surface of the outer peripheral wall of the pillar shaped honeycomb structure portion,
wherein one welding base layer of the pair of welding base layers is provided so as to face other welding base layer of the pair of welding base layers across the central axis of the pillar shaped honeycomb structure portion, and
wherein the pair of welding base layers comprise the welded portion.

4. The electric heating type support according to claim 3, further comprising an electrode layer composed of conductive ceramics between the outer peripheral wall and each of the welding base layers.

5. The electric heating type support according to claim 1, wherein the electric heating type support has a plurality of positions where welding depths are deeper than those of other positions, in the welded portion.

6. The electric heating type support according to claim 1, comprising a plurality of the welded portions.

7. An exhaust gas purifying device, comprising:
the electric heating type support according to claim 1; and
a can body for holding the electric heating type support.

8. A method for producing an electric heating type support, the electric heating type support comprising:
an electrically conductive honeycomb structure comprising a pillar shaped honeycomb structure portion composed of conductive ceramics, the pillar shaped honeycomb structure portion comprising: an outer peripheral wall; and porous partition walls disposed on an inner side of the outer peripheral wall, the porous partition walls defining a plurality of cells, each cell penetrating from one end face to other end face to form a flow path; and
a pair of metal terminals disposed so as to face each other across a central axis of the pillar shaped honeycomb structure portion,
the method comprising the steps of:
disposing each of the metal terminals on a surface of the electrically conductive honeycomb structure;
applying a first thermal energy to each of the metal terminals to melt and deform each of the metal terminals; and
joining each of the metal terminals to the surface of the electrically conductive honeycomb structure by applying a second thermal energy larger than the first thermal energy, after melting and deforming the metal terminal.

9. A joined body, comprising:
a body composed of conductive ceramics, the body being a pillar shaped honeycomb structure portion;
a pair of electrode layers composed of conductive ceramics, the electrode layers being disposed on a surface of the outer peripheral wall of the pillar shaped honeycomb structure portion so as to face each other across the central axis of the pillar shaped honeycomb structure portion; and
metal terminals each joined to a surface of the body via a welded portion so as to follow a surface shape of the body;
wherein the pair of electrode layers comprise the welded portion.

10. A method for producing a joined body, the joined body comprising:
a body composed of conductive ceramics; and
metal terminals each joined to a surface of the body via a welded portion so as to follow a surface shape of the body,
the method comprising the steps of:
disposing each of the metal terminals on a surface of the body and applying a first thermal energy to each of the metal terminals to melt and deform each of the metal terminals; and
joining each of the metal terminals to the surface of the body by applying a second thermal energy larger than the first thermal energy, after melting and deforming the metal terminal.

* * * * *